(12) United States Patent
Kendrick

(10) Patent No.: US 7,034,090 B2
(45) Date of Patent: *Apr. 25, 2006

(54) CONTINUOUS SLURRY POLYMERIZATION VOLATILE REMOVAL

(75) Inventor: James Austin Kendrick, Baton Rouge, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 788 days.

This patent is subject to a terminal disclaimer.

(21) Appl. No.: 10/023,677

(22) Filed: Feb. 14, 2002

(65) Prior Publication Data

US 2002/0086955 A1 Jul. 4, 2002

Related U.S. Application Data

(60) Division of application No. 09/654,799, filed on Sep. 5, 2000, which is a continuation of application No. 09/081,392, filed on May 18, 1998, now Pat. No. 6,281,300.

(60) Provisional application No. 60/078,859, filed on Mar. 20, 1998.

(51) Int. Cl.
*C08F 2/00* (2006.01)

(52) U.S. Cl. .............................. 526/64; 526/65; 526/68; 526/70; 526/73

(58) Field of Classification Search .................. 526/64, 526/65, 68, 70, 73
See application file for complete search history.

(56) References Cited

U.S. PATENT DOCUMENTS

| | | | |
|---|---|---|---|
| 1,693,786 A | 12/1928 | Issachsen | |
| 2,825,721 A | 3/1958 | Hogan et al. | |
| 2,915,513 A | 12/1959 | Leatherman et al. | |
| 2,988,527 A | 6/1961 | Tegge | |
| 3,152,872 A | 10/1964 | Scoggin | |
| 3,172,737 A | 3/1965 | Whittington | |
| 3,203,766 A | 8/1965 | Mudd et al. | |
| 3,242,150 A | 3/1966 | Scoggin | |
| 3,248,179 A | 4/1966 | Norwood | |
| 3,257,363 A | 6/1966 | Miller et al. | |
| 3,262,922 A | 7/1966 | Payne | |
| 3,293,000 A | 12/1966 | Marwil | |
| 3,318,857 A | 5/1967 | Dietz | |
| 3,324,093 A | 6/1967 | Alleman | |
| 3,418,305 A | 12/1968 | Payne et al. | |
| 3,551,403 A | 12/1970 | Delbouille et al. | |
| 3,625,658 A | 12/1971 | Closon | |
| 3,640,980 A | 2/1972 | Baba | |
| 3,794,627 A | 2/1974 | Giachetto | |
| 3,816,383 A | 6/1974 | Stotko | |
| 3,858,943 A | 1/1975 | Bose et al. | |
| 3,956,061 A | 5/1976 | Young et al. | |
| 3,956,257 A | 5/1976 | Hogan | |
| 4,007,321 A | 2/1977 | Scholz et al. | |
| 4,099,335 A | 7/1978 | Jezl et al. | |
| 4,121,029 A | 10/1978 | Irvin et al. | |
| 4,199,546 A | 4/1980 | Kirch | |
| 4,372,758 A | 2/1983 | Bobst et al. | |
| 4,383,972 A | 5/1983 | McCurdy et al. | |
| 4,395,523 A | 7/1983 | Kirch | |
| 4,424,341 A | 1/1984 | Hanson et al. | |
| 4,436,902 A | 3/1984 | Wood et al. | |
| 4,439,601 A | 3/1984 | McCurdy et al. | |
| 4,461,889 A | 7/1984 | Hanson | |
| 4,501,885 A | 2/1985 | Sherk et al. | |
| 4,589,957 A | 5/1986 | Sherk et al. | |
| 4,596,862 A | 6/1986 | McDaniel et al. | |
| 4,613,484 A | 9/1986 | Ayres et al. | |
| 4,632,976 A | 12/1986 | Asanuma et al. | |
| 4,690,804 A | 9/1987 | Rohlfing | |
| 4,713,444 A | 12/1987 | Matsuyama et al. | |
| 4,737,280 A | 4/1988 | Hanson | |
| 6,319,997 B1 | 11/2001 | Kendrick et al. | |
| 6,380,325 B1 | 4/2002 | Kendrick | |
| 2001/0012497 A1 | 8/2001 | Debras | |
| 6,281,300 B1 | 8/2001 | Kendrick | |
| 6,239,235 B1 | 5/2001 | Hottovy et al. | |

(Continued)

FOREIGN PATENT DOCUMENTS

CA         857386        12/1970

(Continued)

OTHER PUBLICATIONS

K.B. Bryan et al., "Polypropylene: Supplement A." *SRI International Report*, Process Economics Program, Report No. 128A, Aug. 1993.

(Continued)

*Primary Examiner*—Bernard Lipman
(74) *Attorney, Agent, or Firm*—Frank E. Reid; Maria C. Walsh

(57) ABSTRACT

A process/apparatus is disclosed for continuously separating a liquid medium comprising diluent and unreacted monomers from a polymerization effluent comprising diluent, unreacted monomers and polymer solids, comprising a continuous discharge of the polymerization effluent from a slurry reactor through a discharge valve and transfer conduit into a first intermediate pressure flash tank with a conical bottom defined by substantially straight sides inclined at an angle to that of horizontal equal to or greater than the angle of slide of the slurry/polymer solids and an exit seal chamber of such diameter (d) and length (l) as to maintain a desired volume of concentrated polymer solids/slurry in the exit seal chamber such as to form a pressure seal while continuously discharging a plug flow of concentrated polymer solids/slurry bottom product of said first flash tank from the exit seal chamber through a seal chamber exit reducer with inclined sides defined by substantially straight sides inclined at an angle to that of horizontal equal to or greater than the angle of slide of the polymer solids which remain after removal of about 50 to 100% of the inert diluent therefrom to a second flash tank at a lower pressure.

9 Claims, 2 Drawing Sheets

U.S. PATENT DOCUMENTS

| | | | |
|---|---|---|---|
| 4,794,151 A | 12/1988 | Mueller-Mall et al. |
| 4,832,915 A | 5/1989 | Messura et al. |
| 5,183,866 A | 2/1993 | Hottovy |
| 5,207,929 A | 5/1993 | Sung et al. |
| 5,276,115 A | 1/1994 | Bohmer et al. |
| 5,292,863 A | 3/1994 | Wang |
| 5,314,579 A | 5/1994 | Sung |
| 5,326,835 A | 7/1994 | Ahvenainen et al. |
| 5,387,659 A | 2/1995 | Hottovy et al. |
| 5,391,656 A | 2/1995 | Campbell et al. |
| 5,416,179 A | 5/1995 | Welch et al. |
| 5,436,212 A | 7/1995 | Geerts |
| 5,455,314 A | 10/1995 | Burns et al. |
| 5,473,020 A | 12/1995 | Peifer et al. |
| 5,480,948 A | 1/1996 | Geerts |
| 5,492,985 A | 2/1996 | Peifer et al. |
| 5,565,174 A | 10/1996 | Burns et al. |
| 5,565,175 A | 10/1996 | Hottovy et al. |
| 5,575,979 A | 11/1996 | Hanson |
| 5,597,892 A | 1/1997 | Hanson |
| 5,639,834 A | 6/1997 | Debras et al. |
| 5,712,365 A | 1/1998 | Arai et al. |
| 5,747,407 A | 5/1998 | Martin |
| 5,986,021 A | 11/1999 | Hokkanen et al. |
| 6,042,790 A | 3/2000 | Hottovy et al. |
| 6,045,661 A | 4/2000 | Kreischer et al. |
| 6,204,344 B1 | 3/2001 | Kendrick et al. |

FOREIGN PATENT DOCUMENTS

| | | |
|---|---|---|
| DE | 1800935 | 5/1969 |
| EP | 0415427 | 3/1991 |
| EP | 416379 | 3/1991 |
| EP | 432555 | 6/1991 |
| EP | 0519266 | 3/1992 |
| EP | 0 479 186 | 4/1992 |
| EP | 0648697 | 4/1995 |
| EP | 0891990 | 1/1999 |
| FI | 96216 | 2/1996 |
| GB | 841263 | 7/1960 |
| GB | 1 435 965 | 5/1976 |
| JP | 72013367 | 4/1972 |
| JP | 62-13408 | 8/1989 |
| JP | 07-286004 | 10/1995 |
| WO | WO96/18662 | 6/1996 |
| WO | WO9736942 | 10/1997 |
| WO | WO9947251 | 9/1999 |
| WO | WO9960028 | 11/1999 |
| WO | WO0002929 | 1/2000 |
| WO | WO 01/05842 A1 | 1/2001 |

OTHER PUBLICATIONS

Declaration of Scott T. Roger As Part Of Supplemental Information Disclosure Statement (proprietary material).

R.H. Perry & C.H. Chilton (Eds.), *Chemical Engineers' Handbook* (5th ed.), McGraw-Hill, Inc., New York, New York, pp. 5-46-5-47 (1973).

U.S. Appl. No. 09/080,412 entitled "Continuous Slurry Polymerization Volatile Removal", filed May 18, 1998, Inventor: James Austin Kendrick.

U.S. Appl. No. 09/955,729 entitled "Continuous Slurry Polymerization Volatile Removal", filed Sep. 19, 2001, Inventors: James Austin Kendrick et al.

U.S. Appl. No. 10/147,219 entitled "Continuous Slurry Polymerization Volatile Removal", filed May 14, 2002, Inventor: James Austin Kendrick.

U.S. Appl. No. 09/992,770 entitled "Continuous Slurry Polymerization Volatile Removal", filed Nov. 6, 2001, Inventors: James Austin Kendrick et al.

U.S. Appl. No. 09/992,590 entitled "Continuous Slurry Polymerization Volatile Removal", filed Nov. 6, 2001, Inventors: James Austin Kendrick et al.

U.S. Appl. No. 10/079,226 entitled "Continuous Slurry Polymerization Process and Apparatus", filed Feb. 19, 2002, Inventors: James Austin Kendrick et al.

U.S. Appl. No. 10/085,809 entitled "Continuous Slurry Polymerization Process and Apparatus", filed Feb. 28, 2002, Inventors: James Austin Kendrick et al.

"Continuous Slurry Polymerization Volatile Removal", J. A. Kendrick et al., filed Nov. 6, 2001.

Michael Arne, SRI International, High Density Polyethylene, Supplement D, A private report by the Process Economics Program, May 1989.

J. P. Hogan et al., "Phillips Petroleum Company Loop Reactor Polyethylene Technology", Journal of Applied Polymer Science: Applied Polymer Symposium, 36, 49-60 (1981).

"Total Quality Report", vol. 13, No. 1 (Jan./Feb. 1998), p. 4, Baton Rouge, LA.

Chem Systems Inc., High Density Polyethylene 91-6-51-61 ( Apr. 1993) ("the Chem Systems report").

Declaration of Scott Roger for Submission of Prior Art ("the Roger declaration").

U.S. Appl. No. 10/375,660 entitled "Continuous Slurry Polymerization Process and Apparatus", filed Feb. 27, 2003, Inventors: James Austin Kendrick et al.

U.S. Appl. No. 10/260,010 entitled "Continuous Slurry Polymerization Process and Apparatus", filed Mar. 11, 2003, Inventors: James Austin Kendrick et al.

U.S. Appl. No. 10/260,011 entitled "Continuous Slurry Polymerization Process and Apparatus", filed Mar. 11, 2003, Inventors: James Austin Kendrick et al.

CONTINUOUS SLURRY POLYMERIZATION VOLATILE REMOVAL

CROSS-REFERENCE TO RELATED APPLICATIONS

This application is a divisional application of Ser. No. 09/654,799, filed Sep. 5, 2000, now allowed, which is a continuation application of Ser. No. 09/081, 392, filed May 18, 1998, now U.S. Pat. No. 6,281,300, which claims the benefit of and priority to Ser. No. 60/078,859, filed Mar. 20, 1998, all of which are incorporated herein by reference.

STATEMENT REGARDING FEDERALLY SPONSORED RESEARCH

Not applicable.

BACKGROUND OF THE INVENTION

In many polymerization processes for the production of polymer, a polymerization effluent is formed which is a slurry of particulate polymer solids suspended in a liquid medium, ordinarily the reaction diluent and unreacted monomers. A typical example of such processes is disclosed in Hogan and Bank's U.S. Pat. No. 2,285,721, the disclosure of which is incorporated herein by reference. While the polymerization processes described in the Hogan document employs a catalyst comprising chromium oxide and a support, the present invention is applicable to any process producing an effluent comprising a slurry of particulate polymer solids suspended in a liquid medium comprising a diluent and unreacted monomer. Such reaction processes include those which have come to be known in the art as particle form polymerizations.

In most commercial scale operations, it is desirable to separate the polymer and the liquid medium comprising an inert diluent and unreacted monomers in such a manner that the liquid medium is not exposed to contamination so that the liquid medium can be recycled to the polymerization zone with minimal if any purification. A particularly favored technique that has been used heretofore is that disclosed in the Scoggin et al, U.S. Pat. No. 3,152,872, more particularly the embodiment illustrated in conjunction with FIG. 2 of that patent. In such processes the reaction diluent, dissolved monomers, and catalyst are circulated in a loop reactor wherein the pressure of the polymerization reaction is about 100 to 700 psia. The produced solid polymer is also circulated in the reactor. A slurry of polymer and the liquid medium is collected in one or more settling legs of the slurry loop reactor from which the slurry is periodically discharged to a flash chamber wherein the mixture is flashed to a low pressure such as about 20 psia. While the flashing results in substantially complete removal of the liquid medium from the polymer, it is necessary to recompress the vaporized polymerization diluent (i.e., isobutane) in order to condense the recovered diluent to a liquid form suitable for recycling as liquid diluent to the polymerization zone. The cost of compression equipment and the utilities required for its operation often amounts to a significant portion of the expense involved in producing polymer.

Some polymerization processes distill the liquefied diluent prior to recycling to the reactor. The purpose of distillation is removal of monomers and light-end contaminants. The distilled liquid diluent is then passed through a treater bed to remove catalyst poisons and then on to the reactor. The equipment and utilities costs for distillation and treatment can be a significant portion of the cost of producing the polymer.

In a commercial scale operation, it is desirable to liquefy the diluent vapors at minimum cost. One such technique used heretofore is disclosed in Hanson and Sherk's U.S. Pat. No. 4,424,341 in which an intermediate pressure flash step removes a significant portion of the diluent at such a temperature and at such a pressure that this flashed portion of diluent may be liquified by heat exchange instead of by a more costly compression procedure.

BRIEF SUMMARY OF THE INVENTION

The present invention relates to an apparatus for continuously separating polymer solids from a liquid medium comprising an inert diluent and unreacted monomers. In another aspect, the invention relates to an apparatus for continuously separating polymer solids from a liquid medium, drying the polymer, and recovering the diluent and unreacted monomers with a reduction in compression needed for diluent vapor condensation to liquid diluent for reuse in a polymerization process. In another aspect, the invention relates to a method for continuously separating polymer solids from a liquid medium. In another aspect, the invention relates to a method for continuously separating polymer solids from a liquid medium, drying the polymer, and recovering the inert diluent and unreacted monomers for reuse in a polymerization process.

In accordance with the present invention, there is provided an apparatus for continuously recovering polymer solids from a polymerization effluent comprising a slurry of said polymer solids in a liquid medium comprising an inert diluent and unreacted monomers. The apparatus comprises a discharge valve on a slurry reactor, examples of which include slurry loop reactors and stirred tank slurry reactors, for the continuous discharge of a portion of the slurry reactor contents into a first transfer conduit: a first flash tank having a bottom defined by substantially straight sides inclined at an angle to the horizontal equal to or greater than the angle of slide of the slurry/polymer solids; wherein the pressure of the first flash tank and temperature of the polymerization effluent are such that from about 50% to about 100% of the liquid medium will be vaporized and the inert diluent component of said vapor is condensable, without compression, by heat exchange with a fluid having a temperature in the range of about 65° F. to about 135° F.: a first flash tank exit seal chamber, communicating with said first flash tank, of such a length (l) and diameter (d) as to permit such a level of concentrated polymer solids/slurry to accumulate and form a pressure seal in said first flash tank exit seal chamber: a seal chamber exit reducer providing for a continuous discharge of a plug flow of concentrated polymer solids/slurry to a second transfer conduit which communicates the concentrated polymer solids/slurry into a second flash tank wherein the pressure of said second flash tank and temperature of the concentrated polymer solids/slurry are such that essentially all of any remaining inert diluent and/or unreacted monomer will be vaporized and removed overhead for condensation by compression and heat exchange and the polymer solids are discharged from the bottom of said second flash tank for additional processing or storage.

The invention provides also a method for the continuous removal of a stream of polymerization effluent from a slurry reactor through a discharge valve; increasing the heat content of the polymerization effluent during its transit through said first transfer conduit to a temperature below the fusion point of the polymer while continuously communicating the polymerization effluent to a first flash tank having a bottom defined by substantially straight sides inclined at an angle to the horizontal equal to or greater than the angle of slide of the concentrated polymer solids/slurry; continuously vaporizing from about 50% to about 100% of the liquid medium in said first heated flash tank to yield a concentrated polymer solids/slurry and a vapor stream at such a temperature and pressure that the inert diluent content of said vapor is condensable, without compression, by heat exchange with a fluid having a temperature in the range from about 65° F. to about 135° F.; continuously discharging the concentrated polymer solids/slurry from said first flash tank to a first flash tank exit seal chamber of such a length (l) and diameter (d) that a volume of concentrated polymer solids/slurry is continuously maintained so as to form a pressure seal in said first flash tank exit seal chamber; continuously discharging the concentrated polymer solids/slurry from said first flash tank seal chamber through a seal chamber exit reducer defined by substantially straight sides inclined at an angle to that of horizontal equal to or greater than the angle of slide of the polymer solids which remain after removal of about 50 to 100% of the inert diluent therefrom; communicating a continuous plug flow of concentrated polymer solids/slurry from said first flash tank exit seal chamber through said seal chamber exit reducer to a second transfer conduit which communicates said continuous plug flow of concentrated polymer solids/slurry to a second flash tank; and continuously vaporizing essentially all of any remaining inert diluent and/or unreacted monomer in a second flash tank operated at a lower pressure than said first flash tank; condensing the vaporized inert diluent and/or unreacted monomer from said second flash tank by compression and heat exchange; and continuously discharging the essentially dried polymer slurry from said second flash tank for further processing or storage.

An object of the present invention is to provide both an apparatus and method for the continuous two stage flash drying of the polymer solids following the continuous removal of the polymerization effluent comprising polymer solids and liquid medium comprising inert diluent and unreacted monomers from a slurry reactor through a point discharge valve, a continuous solids level control in the first flash tank exit seal chamber that provides a pressure seal therein which enables said first flash tank to operate under a substantially greater pressure than said second flash tank while polymer solids are continuously discharged through the seal chamber exit reducer into the second transfer conduit and further into the second flash tank which eliminates plugging in the first flash tank and the continuous liquification of from about 50% to about 100% of the inert diluent vapor by heat exchange rather than compression.

Another object of the invention is to eliminate the need for a settling leg on the slurry reactor and the intermittent high pressure pulse in the slurry reactor caused by periodic discharging of the contents of the settling leg. Another object of the present invention is to improve safety by eliminating the possibility of plugging in a settling leg.

Another object of the invention is to eliminate plugging in equipment downstream from the discharge valve. In a settling leg of a polymerization reactor polymerization continues and the heat of reaction further heats the liquid medium and a potential exists for some of the polymer solids to dissolve or to fuse together. As the contents of the settling leg exit the discharge valve, the pressure drop causes flashing of some of the liquid medium which results in cooling the remaining liquid medium causing the dissolved polymer to precipitate which tends to plug downstream equipment. The present invention which eliminates the need for a settling leg also eliminates this potential for downstream equipment plugging by avoiding the initial dissolution or fusion of the polymer solids.

Another object of the present invention is to increase the reactor through-put by the use of increased ethylene concentrations in the liquid medium. Settling legs limit ethylene concentrations due to an increased tendency to plug downstream equipment caused by accelerated reaction within the settling leg. A continuous polymerization effluent slurry flow allows ethylene concentrations to be limited only by the ethylene solubility in the liquid diluent in the reactor, thereby increasing the specific reaction rate for polymerization and increasing reactor throughput.

Other aspects, objects, and advantages of the present invention will be apparent from the following disclosure and FIGS. 1 and 2.

The claimed apparatus and process provide several advantages over the prior art including: (1) allowing for a continuous processing of the contents of a slurry reactor from the point of discharge of the liquified polymerization effluent through a discharge valve; a first flash tank; a seal chamber; a seal chamber exit reducer; and therefrom to a second flash tank, (2) significantly increasing ethylene concentration in the liquid medium thereby increasing reactor through-put and (3) energy consumption is reduced by reducing the need to compress and/or distill the reactor vapor-liquid effluent. Recycling compressors and other downstream equipment can be reduced in size or eliminated.

DETAILED DESCRIPTION OF THE INVENTION

Figure 1:
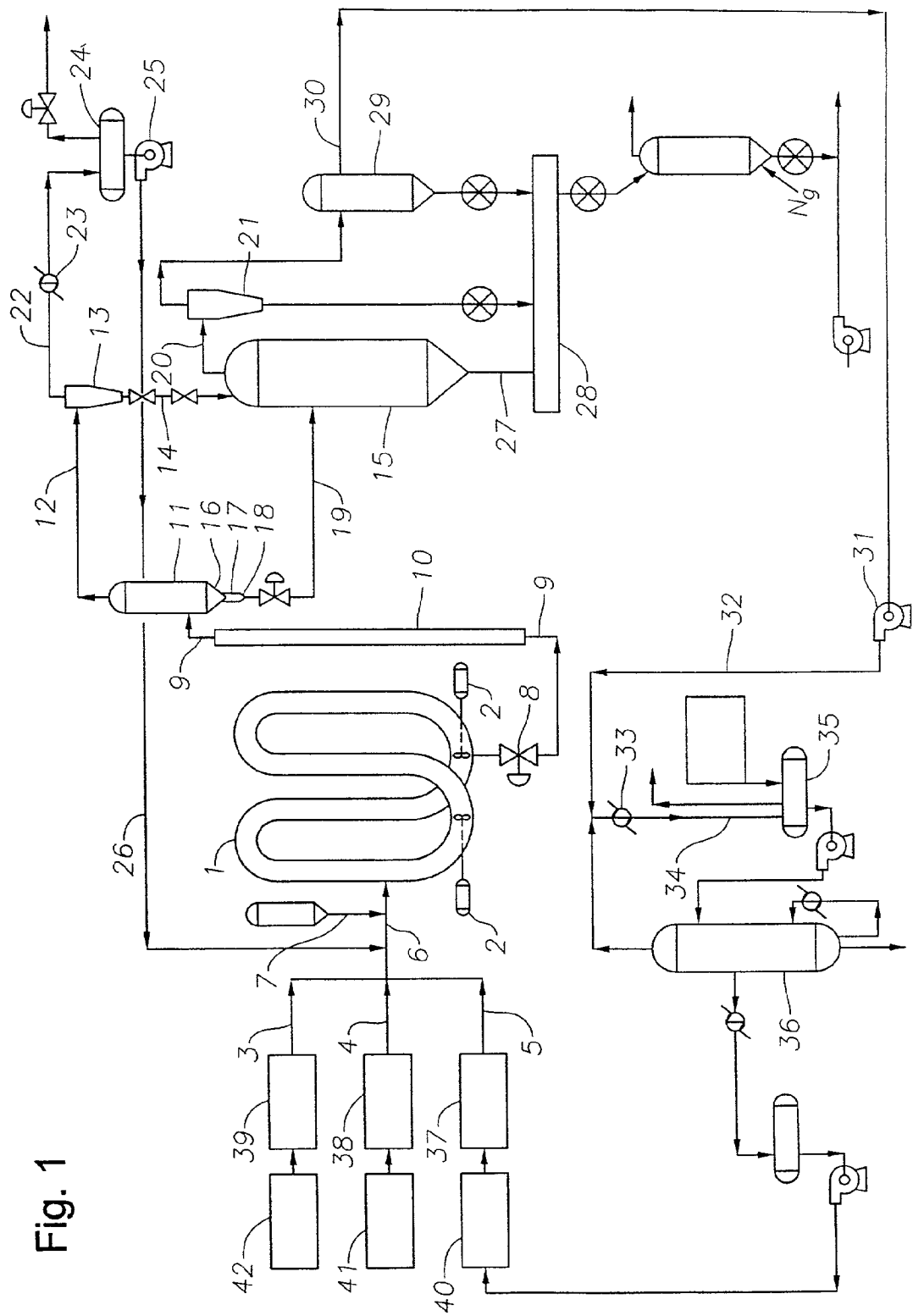
FIGS. 1 and 2 are a schematic diagram illustrating an apparatus for continuously separating polymer solids from diluent and unreacted monomer in accordance with the present invention.

The present invention is applicable to any mixture which comprises a slurry of polymer solids and a liquid medium comprising an inert diluent and unreacted monomers including slurries resulting from olefin polymerization. The olefin monomers generally employed in such reactions are 1-olefins having from 2 up to 8 carbon atoms per molecule. Typical examples include ethylene, propylene, butene, pentene, hexene and octene.

Typical diluents employed in such olefin polymerizations include saturated aliphatic hydrocarbons having 3 to 8, preferably 3 to 4 carbon atoms per molecule, such as propane, isobutane, propylene, n-butane, n-pentane, isopentane, n-hexane, isooctane, and the like. Of these diluents those of 3 to 4 carbon atoms per molecule are preferred, and isobutane is most preferred.

The rate of discharge of the polymerization effluent is such as to allow a continuous process stream from the slurry loop reactor from the point of discharge of the liquified polymerization effluent through a single point discharge valve and also through the first flash tank and the associated vapor recovery and solids recovery systems. The rate of discharge of the polymerization effluent is such as to maintain a constant pressure in the slurry reactor and to eliminate intermittent high pressure pulses associated with a discharge of a portion of the reactor contents that occurs with settling legs on slurry reactors.

The temperature to which the polymerization effluent slurry which is discharged from the reactor is heated during transit to the first flash tank for vaporization is below the fusion temperature of the polymer. This may be accomplished by appropriate heating of this first transfer conduit. The quantity of heat to be supplied to the polymerization effluent during its transit through this first conduit to the first flash tank should preferably be at least equal to that quantity of heat which equals the heat of vaporization of that quantity of inert diluent which is to be flash vaporized in the first flash tank. This then will provide for the concentrated polymer solids formed in the first flash tank to be passed to the second flash tank to pass thereto at a higher solids temperature and thus facilitates the removal of residual diluent in the pores of such polymer solids by the operation of the second flash tank. That quantity of heat transferred to the polymerization effluent during its transit through the first transfer conduit to the first flash tank may even be greater, provided only that the quantity of heat so transferred will not cause the polymer solids therein to become heated to such a temperature at which they will tend to fuse or agglomerate one with another.

The concentrated polymer solids/slurry are discharged from the first flash tank into a first flash tank exit seal chamber of such a length (l) and diameter (d) so as to provide a volume sufficient to maintain a volume of concentrated polymer solids/slurry sufficient to maintain a pressure seal in the exit seal chamber. The concentrated polymer solids/slurry are discharged from the exit seal chamber through an exit seal chamber reducer to a second transfer conduit which communicates the concentrated polymer solids/slurry as a plug flow to a second flash tank. The exit seal chamber reducer is defined by substantially straight sides inclined at an angle to that of horizontal equal to or greater than the angle of slide of the concentrated polymer solids/slurry.

The pressure for the first flash step will vary depending on the nature of the diluent and unreacted monomers and the temperature of the polymerization effluent. Typically, pressures in the range of from about 140 psia to about 315 psia can be employed; more preferably from about 200 psia to about 270 psia; and most preferably from about 225 psia to about 250 psia.

The heat exchanging fluid used to condense the vapor from the first flash step is at a temperature in the range of from about 65° F. to about 135° F. A preferred embodiment uses a heat exchange fluid at a temperature of from about 75° F. to about 125° F. A most preferred embodiment uses a heat exchange fluid at a temperature of from about 85° F. to about 115° F.

A further understanding of the present invention will be provided by referring to FIG. 1 which illustrates a system comprising an embodiment of the invention.

In the embodiment illustrated in FIG. 1, the polymerization is carried out in a loop reactor 1. The polymerization mixture is circulated by agitator 2. Diluent comonomer and monomer are introduced from the diluent storage vessel 40, the comonomer storage vessel 41, and the monomer storage vessel 42 through their respective treater beds 37, 38, and 39 through conduits 5, 4 and 3, respectively, connected to conduit 6. Catalyst is added through conduit 7. Normally, catalyst is introduced as a suspension in a hydrocarbon diluent.

Polymerization effluent is removed from the loop by continuous discharge through the single point discharge valve 8. The polymerization effluent passes from the discharge valve 8 to a conduit 9 which is provided with a line heater 10 and into the first flash tank 11 which separates vaporized liquid medium from polymer slurry/solids. Conduit 9 has an indirect heat exchange means such as a flash line heater 10.

Vaporized liquid medium comprising diluent and unreacted monomers exit the first flash tank 11 via transfer conduit 12 through which it is passed into a cyclone 13 which separates entrained polymer solids from the vapor. Polymer solids separated by the cyclone are passed via line 14 through a dual valving assembly designed to maintain a pressure seal below cyclone 13 to a lower pressure flash tank 15.

Figure 2:
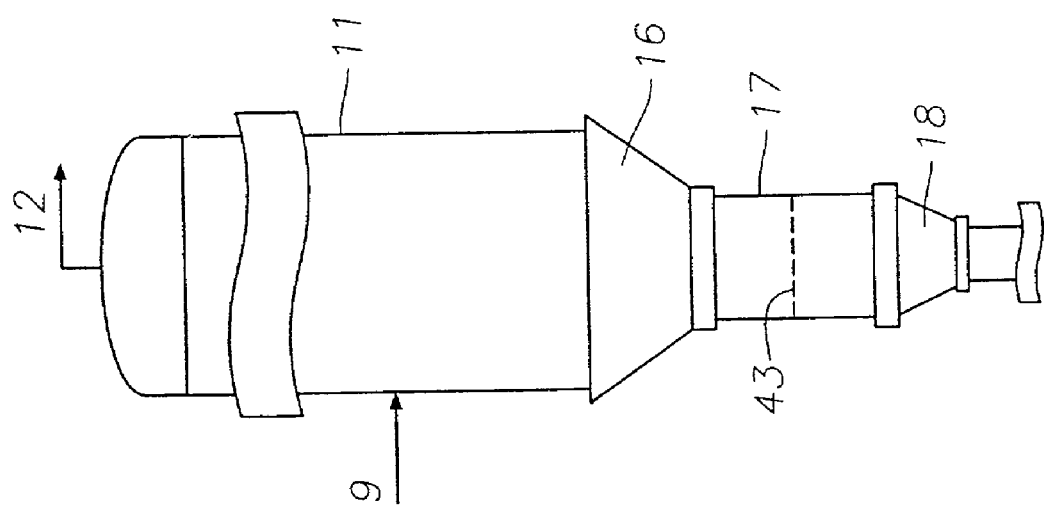

The concentrated polymer solids/slurry in the bottom of the first flash tank 11 continuously settles by sliding along the straight line bottom surface 16 thereof into the seal chamber 17 which is illustrated in enlargement FIG. 2. A polymer solids/slurry level 43 is maintained in the seal chamber 17 to eliminate plugging tendencies in flash tank 11 and to form a pressure seal so that flash tank 11 can operate at a substantially higher pressure than flash tank 15. Polymer slurry/solids are continuously discharged from the seal chamber 17 into the lower pressure flash tank 15. The length (l), diameter (d), and volume of the seal chamber 17 and the geometry of the seal chamber exit reducer 18 are chosen so as to provide a variable residence time and provide a continuous plug flow of concentrated polymer solids/slurry to minimize "dead" space and reduce plugging tendencies. The seal chamber 17 length must be sufficient to allow practical level measurement and control. Typical residence times of the concentrated polymer solid/slurry in the seal chamber 17 are from 5 seconds to 10 minutes, preferable residence times are from 10 seconds to 2 minutes and most preferable residence times from 15–45 seconds. The continuous plug flow of concentrated polymer solids/slurry forms a pressure seal wherein the concentrated polymer solids/slurry have an l/d ratio inside the seal chamber 17 which is typically 1.5 to 8, preferable l/d is 2 to 6 and most preferable is 2.2 to 3. Typically the seal chamber exit reducer 18 sides are inclined, relative to the horizontal, 60–85 degrees, preferable 65–80 degrees and most preferable 68–75 degrees. The seal chamber exit reducer 18 geometry is defined by substantially straight sides inclined at an angle to that of horizontal equal to or greater than the angle of slide of the concentrated polymer slurry/solids and communicates the concentrated polymer solid/slurry to a second transfer conduit 19 which communicates with a feed inlet of flash tank 15. In flash tank 15 substantially all of any remaining inert diluent and unreacted monomer in the concentrated polymerization effluent is vaporized and taken overhead via conduit 20 to a second cyclone 21.

The major portion of the liquid medium in the polymerization effluent will have been taken to cyclone 13 as vapor. The vapor after having the entrained polymer solids removed is passed via conduit 22 through a heat exchanger 23 wherein the vapor at a pressure from about 140 psia to about 315 psia is condensed by indirect heat exchange with a heat exchange fluid such as to eliminate the need for compression.

The condensed liquid medium comprising diluent and unreacted monomers is then passed to an accumulator 24. A pump 25 is provided for conveying the condensed liquid medium back to the polymerization zone by line 26.

The polymer solids in the lower pressure flash tank 15 are passed via line 27 to a conventional dryer 28. The vapor exiting the secondary cyclone 21, after filtration in filter unit 29, is passed by line 30 to a compressor 31 and the compressed vapors are passed through a conduit 32 to a condenser 33 where vapor is condensed and the condensate is passed through conduit 34 to storage vessel 35. The condensed liquid medium in the storage vessel 35 is typically vented overhead for removal of light-end contaminants. The inert diluent can be returned to the process through a treater bed 37 to remove catalyst poisons or distilled in unit 36 for more complete removal of light-ends and then returned to the process through a treater bed.

Having broadly described the present invention it is believed that the same will become even more apparent by reference to the following examples. It will be appreciated that the examples are presented solely for the purpose of illustration and should not be construed as limiting the invention.

EXAMPLES

Example 1

A typical ethylene polymerization process would be conducted at a temperature of about 215° F. and a pressure of 565 psia. An example of such a process would result in a polymerization effluent of about 83,000 pounds per hour comprising about 45,000 pounds per hour of polyethylene polymer solids and about 38,000 pounds per hour of isobutane and unreacted monomers. The continuously discharged polymerization effluent is flashed in the first flash tank at a pressure of about 240 psia and a temperature of about 180° F. to remove overhead about 35,000 pounds per hour of diluent and unreacted monomer vapors and entrained particulates. Auxiliary heat to impart an additional quantity of heat to the polymerization effluent is supplied by appropriate heating means during the transit between the discharge valve and the first flash tank. After removal of the fines, the isobutane vapor is condensed, without compression, by heat exchange at a pressure of about 240 psia and a temperature of about 135° F. The polymer slurry/solids discharging from the bottom of the first flash tank into the seal chamber form a continuous plug flow of concentrated polymer slurry/solids, which provides a pressure seal, with an l/d ratio of the plug of polymer slurry/solids of 2.5 in an 8'4" long seal chamber having an l/d ratio of 5.5 and with a cone angle of about 68° on the seal chamber exit reducer. The residence time of the continuous plug flow of concentrated polymer slurry/solids is about 16 seconds. The concentrated polymer slurry/solids are continuously discharged from the bottom of the first flash tank at a temperature of about 180° F. and a pressure of about 240 psia through a seal chamber, seal chamber exit reducer, and a second transfer conduit into a feed inlet on a second flash tank. The remaining liquid medium in the concentrated polymer slurry/solids communicated to the second flash tank is flashed at a temperature of about 175° F. and at a pressure of about 25 psia to remove about 4,300 pounds per hour of isobutane and unreacted monomers which are condensed by compression and heat exchange.

Example 2

A typical ethylene polymerization process would be conducted at a temperature of about 215° F. and a pressure of 565 psia. An example of such a process would result in a polymerization effluent of about 83,000 pounds per hour comprising about 45,000 pounds per hour of polyethylene polymer solids and about 38,000 pounds per hour of isobutane and unreacted monomers. The continuously discharged polymerization effluent is flashed in the first flash tank at a pressure of about 240 psia and a temperature of about 175° F. to remove overhead about 23,000 pounds per hour of diluent and unreacted monomer vapors and entrained particulates. After removal of the fines, the isobutane vapor is condensed, without compression, by heat exchange at a pressure of about 240 psia and a temperature of about 112° F. The polymer slurry/solids discharging from the bottom of the first flash tank into the seal chamber form a continuous plug flow of concentrated polymer slurry/solids, which provides a pressure seal, with an l/d ratio of the plug of polymer slurry/solids of 2.5 in an 8'4" long seal chamber with an l/d ratio of 5.5 and with a cone angle of about 68° on the seal chamber exit reducer. The residence time of the continuous plug flow of concentrated polymer slurry/solids in the seal chamber is about 16 seconds. About 60,000 pounds per hour of concentrated polymer slurry/solids are continuously discharged from the bottom of the first flash tank at a temperature of about 175° F. and a pressure of about 240 psia through a seal chamber, seal chamber exit reducer and a second transfer conduit into a feed inlet on a second flash tank. The remaining liquid medium in the concentrated polymer slurry/solids communicated to the second flash tank is flashed at a temperature of about 125° F. and at a pressure of about 25 psia to remove about 16,000 pounds per hour of isobutane and unreacted monomer which are condensed by compression and heat exchange.

What is claimed is:

1. A process comprising:
    polymerizing at least one monomer in liquid diluent in a slurry reactor to produce a slurry of polymer solids in a liquid medium;
    continuously discharging a portion of the slurry from the slurry reactor as polymerization effluent; and
    flashing the polymerization effluent in a first flash to vaporize from about 50% to about 100% of the liquid in the polymerization effluent to produce concentrated polymer effluent and vaporized liquid;
    wherein the rate of discharge of the polymerization effluent from the slurry reactor is such as to maintain constant pressure in the slurry reactor.

2. The process of claim 1, wherein the rate of discharge of the polymerization effluent is such as to eliminate intermittent high pressure pulses in the slurry reactor.

3. The process of claim 1, wherein the polymerization is conducted in a loop reactor.

4. The process of claim 1, wherein the concentrated polymer effluent and vaporized liquid are continuously separated.

5. The process of claim 1, wherein the concentrated polymer effluent is flashed in a second flash to vaporize liquid.

6. The process of claim 1, wherein the vaporized liquid from the first flash contains entrained polymer solids and is subjected to a separation to separate polymer solids from the vaporized liquid.

7. The process of claim 4, wherein the resulting separated, vaporized liquid from the first flash is condensed by indirect heat exchange.

8. The process of claim 5, wherein the vaporized liquid from the second flash contains entrained polymer solids and is subjected to a separation to separate polymer solids from the vaporized liquid.

9. The process of claim 5, wherein the vaporized liquid from the second flash is condensed by compression.

* * * * *